(12) United States Patent
Nakamura et al.

(10) Patent No.: US 10,589,640 B2
(45) Date of Patent: Mar. 17, 2020

(54) POWER SUPPLY UNIT AND VEHICLE SEAT

(71) Applicant: NHK SPRING CO., LTD., Yokohama-shi, Kanagawa (JP)

(72) Inventors: Takeshi Nakamura, Yokohama (JP); Kenichi Katsube, Yokohama (JP); Shota Arimoto, Yokohama (JP); Tomoki Koga, Yokohama (JP)

(73) Assignee: NHK SPRING CO., LTD., Yokohama-shi, Kanagawa (JP)

( * ) Notice: Subject to any disclaimer, the term of this patent is extended or adjusted under 35 U.S.C. 154(b) by 2 days.

(21) Appl. No.: 16/013,057

(22) Filed: Jun. 20, 2018

(65) Prior Publication Data

US 2018/0370388 A1 Dec. 27, 2018

(30) Foreign Application Priority Data

Jun. 26, 2017 (JP) ................................ 2017-124476

(51) Int. Cl.
*H01R 3/00* (2006.01)
*B60N 2/02* (2006.01)
*B60N 2/07* (2006.01)
*B60R 16/02* (2006.01)
*B60R 16/03* (2006.01)
*B60R 16/027* (2006.01)

(52) U.S. Cl.
CPC .......... *B60N 2/0224* (2013.01); *B60N 2/0725* (2013.01); *B60R 16/027* (2013.01); *B60R 16/0215* (2013.01); *B60R 16/03* (2013.01)

(58) Field of Classification Search
CPC .. B60N 2/0224; B60N 2/0725; B60R 16/027; B60R 16/03; B60R 16/0215

USPC ............................ 439/162, 372, 374, 32, 310
See application file for complete search history.

(56) References Cited

U.S. PATENT DOCUMENTS

| | | | | |
|---|---|---|---|---|
| 4,658,212 A | * | 4/1987 | Ozawa | G01R 31/045 324/72.5 |
| 5,718,603 A | * | 2/1998 | Watanabe | G01R 31/045 439/310 |
| 5,761,960 A | * | 6/1998 | Nagai | B23Q 1/58 108/143 |
| 6,544,057 B1 | * | 4/2003 | Stremick | H01R 35/02 439/162 |
| 6,575,760 B2 | * | 6/2003 | Doshita | B60R 16/027 174/72 A |
| 6,997,499 B2 | * | 2/2006 | Tsubaki | B60N 2/0224 174/72 A |
| 7,381,897 B2 | * | 6/2008 | Nishijima | H02G 11/006 174/135 |

(Continued)

FOREIGN PATENT DOCUMENTS

| | | |
|---|---|---|
| JP | 5523568 B2 | 6/2014 |
| JP | 2014-177277 A | 9/2014 |
| JP | 2016-043902 A | 4/2016 |

*Primary Examiner* — Abdullah A Riyami
*Assistant Examiner* — Nelson R. Burgos-Guntin
(74) *Attorney, Agent, or Firm* — Knobbe, Martens, Olson & Bear, LLP

(57) ABSTRACT

A power supply unit including a slide rail that has an opening at an upper side a slider that slides along the slide rail, a first connector that is fixed to one end portion of the slide rail, a second connector that is fixed to the slider, and a flexible cable that is housed inside the slide rail, that has one end connected to the first connector, and that has another end folded back and connected to the second connector.

9 Claims, 16 Drawing Sheets

(56) References Cited

U.S. PATENT DOCUMENTS

| | | | | |
|---|---|---|---|---|
| 7,683,259 B2* | 3/2010 | Tsubaki | ............ | H02G 11/00 |
| | | | | 174/135 |
| 7,829,789 B2* | 11/2010 | Yamaguchi | ............ | B60N 2/0224 |
| | | | | 174/68.1 |
| 8,153,898 B2* | 4/2012 | Aoki | ............ | H02G 11/00 |
| | | | | 174/68.3 |
| 8,169,794 B2* | 5/2012 | Matsukawa | ............ | H04M 1/0237 |
| | | | | 174/117 F |
| 9,219,359 B2* | 12/2015 | Sekino | ............ | H01B 7/0045 |
| 9,308,833 B2* | 4/2016 | Sekino | ............ | B60N 2/0705 |
| 9,401,591 B2* | 7/2016 | Satou | ............ | B60N 2/06 |
| 9,531,173 B2* | 12/2016 | Masuda | ............ | B60R 16/0215 |
| 9,550,460 B2* | 1/2017 | Tsubaki | ............ | B60R 16/027 |
| 9,944,238 B2* | 4/2018 | Ma | ............ | B60R 16/0215 |
| 10,038,314 B2* | 7/2018 | Satou | ............ | B60R 16/0215 |
| 10,286,813 B1* | 5/2019 | Tuffs | ............ | B60N 2/0722 |
| 10,315,593 B2* | 6/2019 | Nishi | ............ | B60R 16/0215 |
| 2006/0199416 A1* | 9/2006 | Tsubaki | ............ | B60R 16/0215 |
| | | | | 439/352 |
| 2007/0087635 A1* | 4/2007 | Terada | ............ | B60N 2/06 |
| | | | | 439/701 |
| 2009/0017662 A1* | 1/2009 | Kinoshita | ............ | H01R 13/629 |
| | | | | 439/310 |
| 2009/0035953 A1* | 2/2009 | Tsubaki | ............ | B60R 16/0215 |
| | | | | 439/34 |
| 2011/0030276 A1* | 2/2011 | Smith | ............ | B60J 1/1853 |
| | | | | 49/70 |
| 2015/0017832 A1* | 1/2015 | Draaijer | ............ | H01R 13/665 |
| | | | | 439/488 |

* cited by examiner

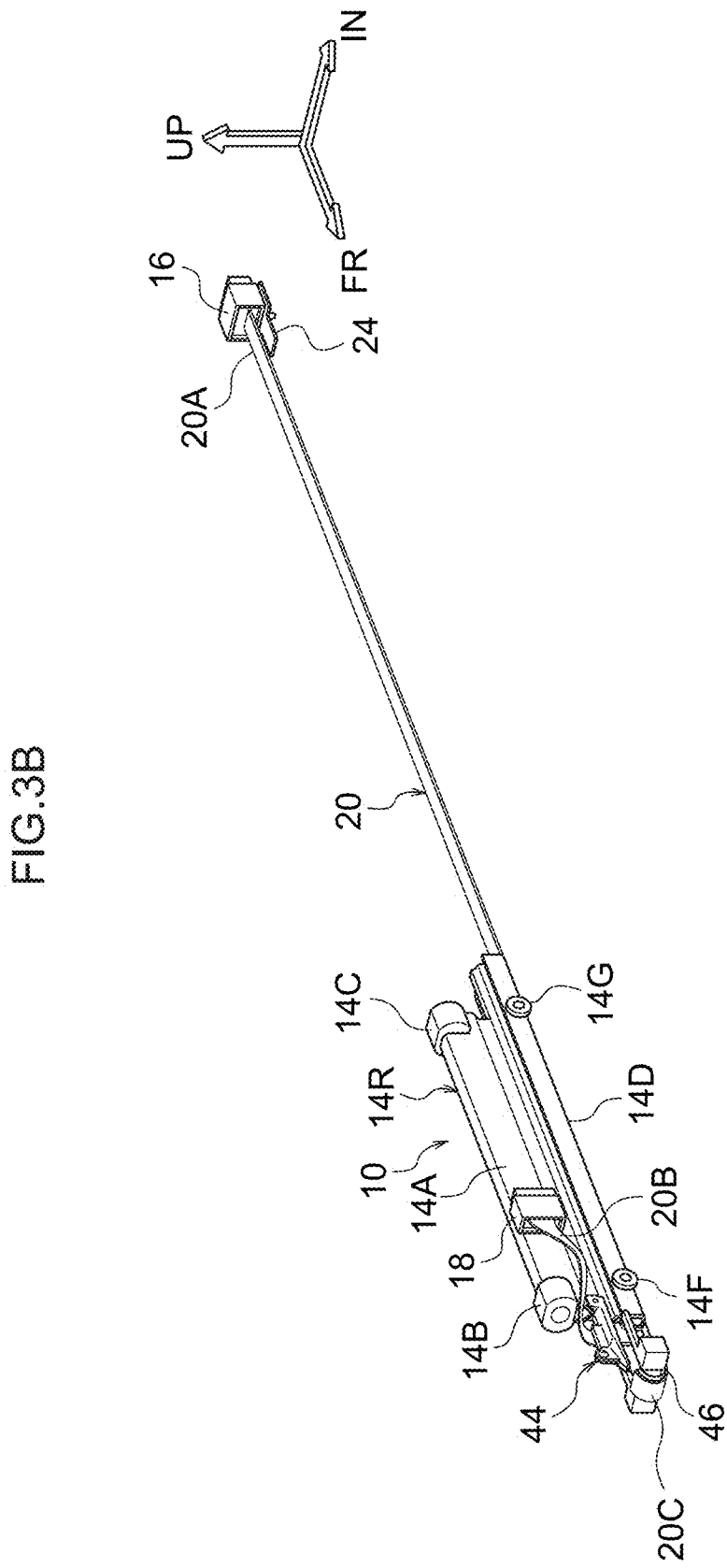

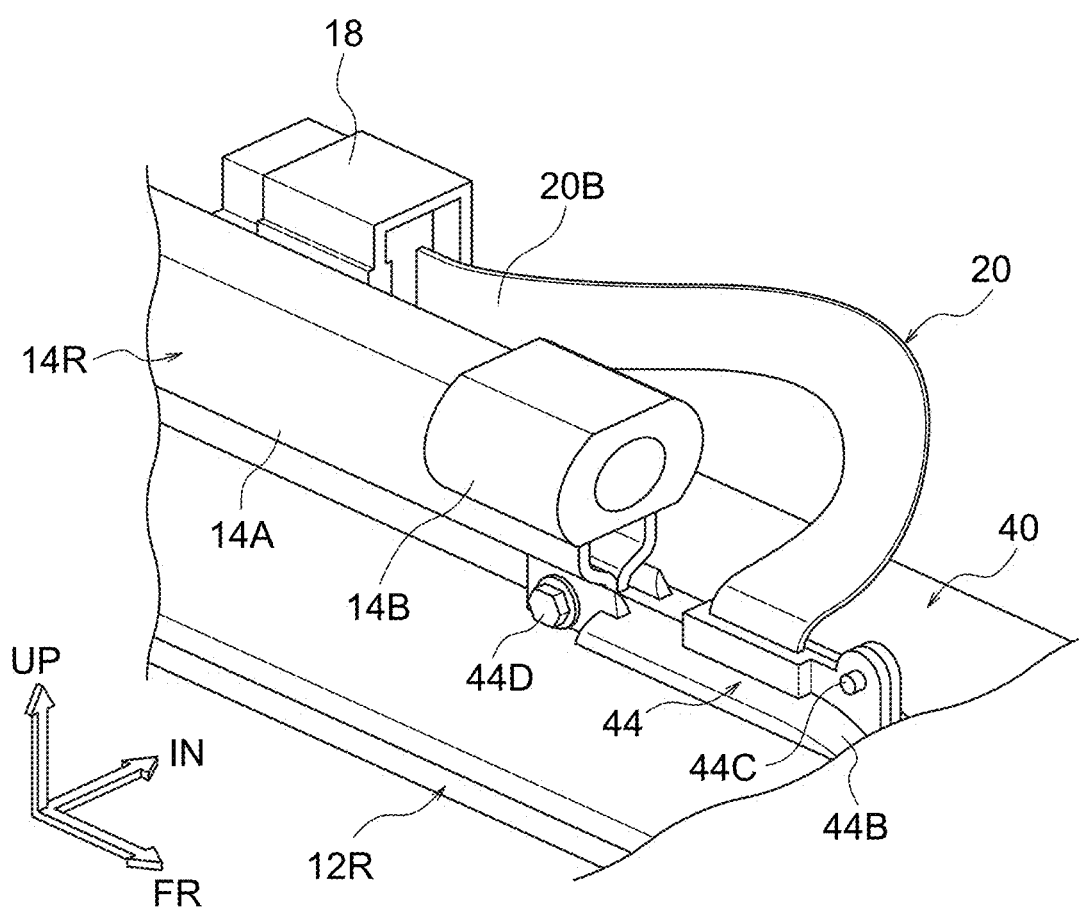

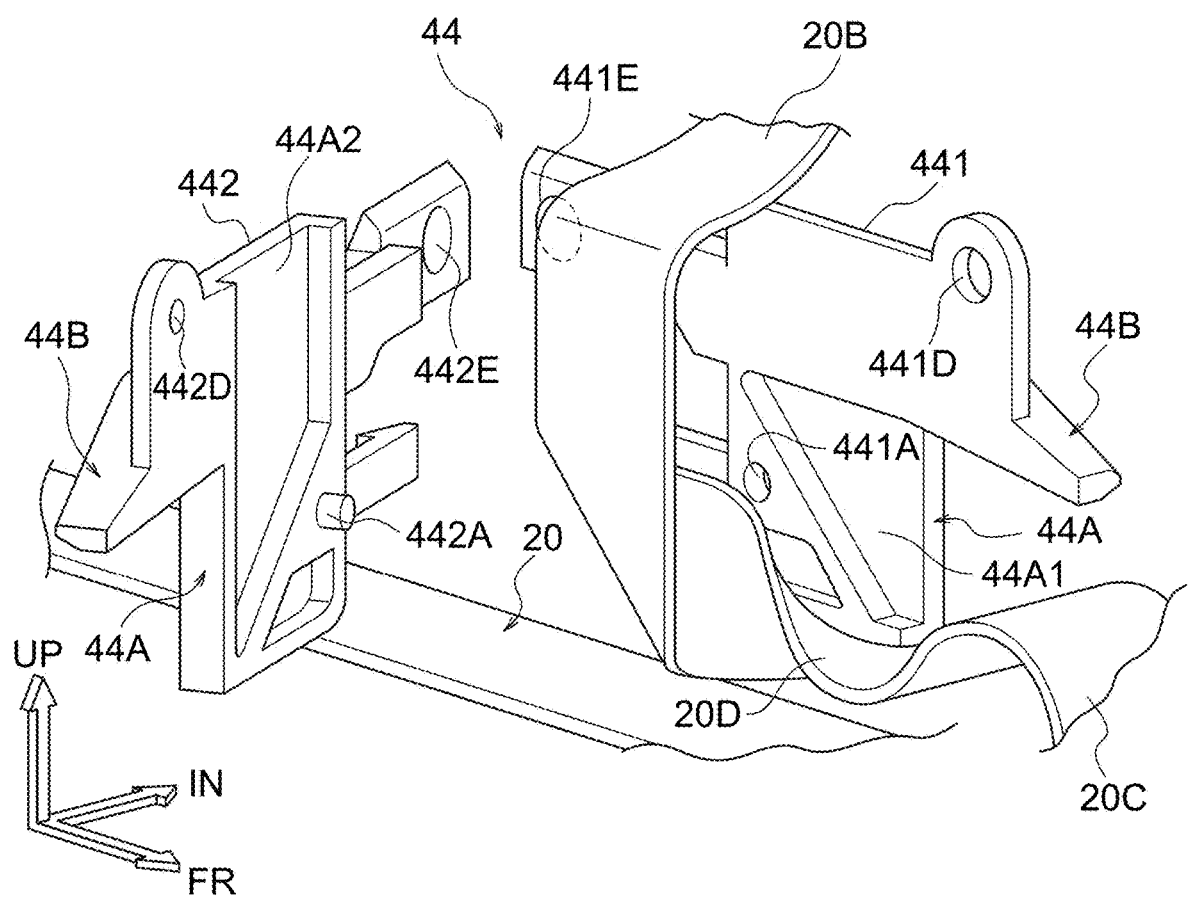

POWER SUPPLY UNIT AND VEHICLE SEAT

CROSS-REFERENCE TO RELATED APPLICATION

This application is based on and claims priority under 35 USC 119 from Japanese Patent Application No. 2017-124476 filed on Jun. 26, 2017, the disclosure of which is incorporated by reference herein.

BACKGROUND

Technical Field

The present disclosure relates to a power supply unit and a vehicle seat. In particular, the present disclosure relates to technology effectively applied to a power supply unit for supplying electric power to a vehicle seat installed in a vehicle cabin of a vehicle such as an automobile, and to a vehicle seat configured including the power supply unit.

Related Art

Japanese Patent Application Laid-Open (JP-A) No. 2016-43902 discloses a power supply rail (power supply unit) supplying electric power to an electric sliding seat from a power source of a vehicle. In this power supply unit, a movable contact mechanism is housed inside a long and thin angular tube shaped case attached to a side face of a side rail (slide rail) that moves the electric sliding seat back and forth along a vehicle front-rear direction. The movable contact mechanism is configured including a flexible flat cable, a fixed terminal, a movable terminal, a slider, an operating lever, a roller guide, and various parts of an extendable and retractable body.

SUMMARY

The power supply unit disclosed in JP-A No. 2016-43902 is attached to the side face of the slide rail fixed to a vehicle cabin interior floor of the vehicle, and so an attachment region (cable routing region) for the power supply unit is required on the vehicle cabin interior floor. There is accordingly room for improvement with respect to an efficient and suitable layout of the slide rail and the electric sliding seat on the vehicle cabin interior floor, while also securing an attachment region for the power supply unit thereon.

The present disclosure provides a power supply unit enabling an efficient and suitable layout on a floor where a slide rail is installed, and a vehicle seat including such a power supply unit.

A power supply unit according to a first aspect of the present disclosure includes a slide rail that has an opening at an upper side, a slider that slides along the slide rail, a first connector that is fixed to one end portion of the slide rail, a second connector that is fixed to the slider, and a flexible cable that is housed inside the slide rail, that has one end connected to the first connector, and that has another end folded back and connected to the second connector.

The power supply unit according to the first aspect includes the slide rail, the slider, the first connector, and the second connector. There is the opening at the upper side of the slide rail. The slider is configured so as to slide along the slide rail. The first connector is fixed to the one end portion of the slide rail. The second connector is fixed to the slider.

Note that the power supply unit includes the cable. The cable is housed inside the slide rail, the one end of the cable is connected to the first connector, and the other end of the cable is folded back and connected to the second connector. Moreover, the cable is flexible. A surplus length location of the cable required for sliding of the cable and the slider is thereby contained inside the slide rail, obviating the need for a region to contain the cable outside the slide rail.

A power supply unit according to a second aspect of the present disclosure is the power supply unit according to the first aspect, further including a rail cover that blocks the opening of the slide rail and that has a slit formed along a length direction of the slide rail, and a cable guide that is installed to the slider, that grips the cable, and that leads the cable into the slide rail through the slit.

The power supply unit according to the second aspect includes the rail cover and the cable guide. The rail cover blocks the opening and the rail cover has the slit formed along the length direction of the slide rail. The cable guide is installed to the slider, grips the cable, and is configured so as to lead the cable into the slide rail through the slit. Since the opening of the slide rail is blocked by the rail cover, ingress of dust, debris, and the like into the slide rail through the opening can be effectively suppressed. In addition thereto, the cable guide is installed to the slider, thereby enabling the cable to be smoothly led into the slide rail, even when the slider is sliding. Moreover, the opening of the slide rail is blocked by the rail cover, such that the inside of the slide rail is harder to see, enabling the appearance of the area surrounding the power supply unit and the slide rail to be improved.

A power supply unit according to a third aspect of the present disclosure is the power supply unit according to the second aspect, wherein the cable guide is configured including a width adjuster portion that increases a width of the slit when the slider passes through to be wider than when the slider is not passing through.

In the power supply unit according to the third aspect, the cable guide is configured including the width adjuster portion. The width adjuster portion increases he slit width when the slider passes through to be wider than when the slider is not passing through. This enables the slit width of the rail cover when the slider is not passing through to be made narrower, and the surface area blocking the opening of the slide rail to be increased, thereby enabling ingress of dust, debris, and the like into the slide rail through the opening to be even more effectively suppressed. This also makes the inside of the slide rail even harder to see, and enables the appearance of the area surrounding the power supply unit and the slide rail to be improved.

A power supply unit according to a fourth aspect of the present disclosure is the power supply unit according to the second aspect, wherein the cable is a flexible flat cable, and the cable guide is configured including a deflecting guide portion that aligns a width direction of the flexible flat cable with a length direction of the slit to insert the flexible flat cable into the slide rail through the slit, and that bends the flexible flat cable inside the slide rail such that a thickness direction of the flexible flat cable is along an up-down direction.

In the power supply unit according to the fourth aspect, the cable is a flexible flat cable, and the cable guide is configured including the deflecting guide portion. The flexible flat cable is housed inside the slide rail with its thickness direction in the up-down direction, and secures current capacity by its width direction. This enables the amount of power supplied by the flexible flat cable to be increased even with a thinner thickness, thereby enabling the routing space of the flexible flat cable inside the slide rail to be reduced, and the flexible flat cable to be easily routed inside the slide rail. The deflecting guide portion aligns the width direction of the flexible flat cable with the length direction of the slit for insertion into the slide rail, and bends the flexible flat cable inside the slide rail such that the thickness direction of the flexible flat cable is in the up-down direction. This enables the flexible flat cable to be passed through the slit without greatly widening the slit width of the rail cover. Expressed in other words, the region where the opening of the slide rail is blocked by the rail cover can be increased, thereby enabling ingress of dust, debris, and the like into the slide rail through the opening is be even more effectively suppressed. The appearance of the area surrounding the power supply unit and the slide rail can also be improved.

A power supply unit according to a fifth aspect of the present disclosure is the power supply unit according to the second aspect, wherein a first guide piece and a second guide piece with left-right symmetrical profiles to each other about a central axis of the cable guide in a seat width direction are superimposed on each other in the seat width direction to form the cable guide. The first guide piece and the second guide piece each include an anchor portion protruding to a seat rear side from a seat rear side end portion. The slider includes a left and right pair of slide portions disposed on either side of a central axis of the slider in the seat width direction in order to slide along the slide rail. The slide portions each include an engaging portion formed at a seat front side end portion. The cable guide is installed to the slider by engaging the anchor portions and the engaging portions with each other.

In the power supply unit according to the fifth aspect, even if the cable guide has a complex shape, the cable guide can be easily manufactured by superimposing the first guide piece and the second guide piece that have left-right symmetrical profiles to each other. Engaging the anchor portions of the first guide piece and the second guide piece with the engaging portions of the slider enables easier installment of the cable guide to the slider, and enables separation of the first guide piece and the second guide piece to be avoided.

A power supply unit according to a sixth aspect of the present disclosure is the power supply unit according to the third aspect, wherein the width adjuster portion is formed at a seat front side end portion of the cable guide in a fan shape gradually widening from a seat front side toward a seat rear side, and with a curving sloped face profile projecting toward a seat upper side.

In the power supply unit according to the sixth aspect, the width adjuster portion has a simple shape and can be easily manufactured. The width adjuster portion widens the slit width of the slit in the cable guide when the slider passes through compared to when the slider is not passing through. This makes the slit width of the rail cover when the slider is not passing through narrower, and enables the surface area blocking the opening of the slide rail to be increased, thereby enabling ingress of dust, debris, and the like into the slide rail through the opening to be even more effectively suppressed.

A power supply unit according to a seventh aspect of the present disclosure is the power supply unit according to the fourth aspect, wherein the cable guide is formed by a first guide piece and a second guide piece with left-right symmetrical profiles to each other about a central axis of the cable guide in a seat width direction and superimposed on each other in the seat width direction. The deflecting guide portion includes a lead-in location and a lead-out location. The lead-in location is formed at a seat width direction outer side of the first guide piece and is recessed in a substantially triangular shape in a side view. The lead-out location is formed at a seat width direction inner side of the second guide piece and is recessed in a substantially trapezoidal shape in a side view.

In the power supply unit according to the seventh aspect, even if the lead-out location and the lead-out location of the deflecting guide portion have a complex shape, the deflecting guide portion can be easily manufactured simply by providing recesses in and superimposing the first guide piece and the second guide piece that have left-right symmetrical profiles to each other.

A power supply unit according to an eighth aspect of the present disclosure is the power supply unit according to the fourth aspect, wherein the other end of the flexible flat cable is connected to the second connector with a width direction of the other end along an up-down direction.

In the power supply unit according to the eighth aspect, the portion of the flexible flat cable with its width direction along the up-down direction can be freely routed in its thickness direction, thereby enabling the degrees of freedom for a fixing position of the second connector to the slider to be increased.

A power supply unit according to a ninth aspect of the present disclosure is the power supply unit according to the fourth aspect, further including a cable supporter that is installed to the slider, that the flexible flat cable is entrained around, and that folds back the flexible flat cable.

The power supply unit according to the ninth aspect includes the cable supporter. The cable supporter is installed to the slider. The flexible flat cable is entrained around the cable supporter, and the flexible flat cable is folded back by the cable supporter. Spanning from the first connector to the cable supporter, the flexible flat cable is thereby pushed inside the slide rail by movement of the cable supporter accompanying sliding of the slider. This enables the routed state of the cable inside the slide rail to be maintained. In addition thereto, the folded-back position of the cable can be moved by the cable supporter so as to correspond to the slide position of the slider, thereby enabling slack in the cable housed inside the slide rail to be reduced, and the slider to slide smoothly.

In a vehicle seat including a power supply unit according to a tenth aspect of the present disclosure, the vehicle seat includes the power supply unit including the slide rail, the slider, the first connector, the second connector, and the cable according to the first aspect, and a seat body that is attached to the slide rail through the slider and that is installed with a load connected to the second connector.

The vehicle seat according to the tenth aspect includes the power supply unit and the seat body. The seat body is attached to the slide rail through the slider. The load is installed to the seat body, and the load is connected to the second connector. This enables similar operation and advantageous effects to be obtained by the vehicle seat as the operation and advantageous effects obtained by the power supply unit according to the first aspect.

The present disclosure enables the provision of a power supply unit enabling an efficient and suitable layout on a floor where a slide rail is installed, and a vehicle seat including such a power supply unit.

BRIEF DESCRIPTION OF THE DRAWINGS

Exemplary embodiments of the present invention will be described in detail based on the following figures, wherein:

FIG. 3B is a perspective view illustrating relevant portions including a slider and a cable of the power supply unit as viewed from the same direction as FIG. 3A;

FIG. 5B is an enlarged perspective view of relevant portions including a slider, the cable, and a second connector of the power supply unit illustrated in FIG. 1A, as viewed obliquely from the vehicle upper front side;

FIG. 6B is an enlarged exploded perspective view of the cable guide including the cable as viewed from the same direction as FIG. 6A;

DETAILED DESCRIPTION

Figure 1A:
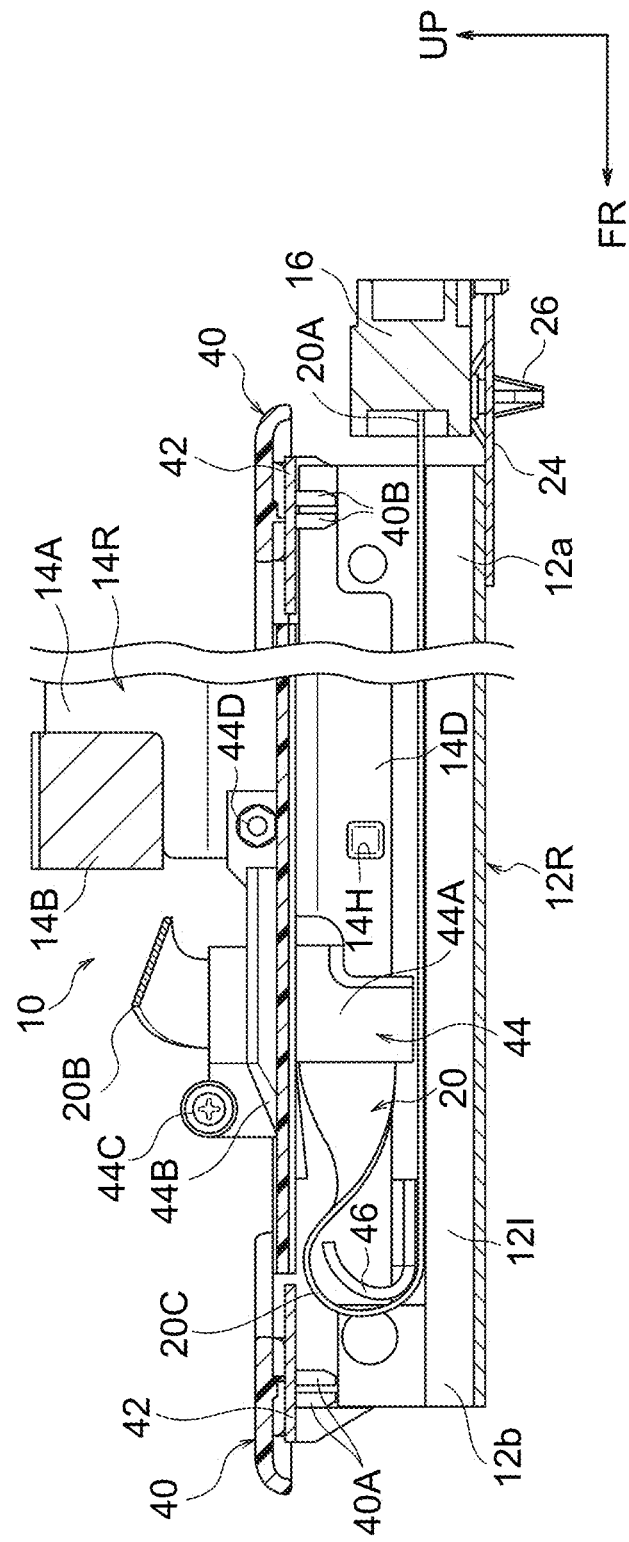
FIG. 1A is an enlarged cross-section (a cross-section sectioned along line A-A illustrated in FIG. 1B) of relevant portions of a power supply unit according to an exemplary embodiment of the present disclosure.

Explanation follows regarding a power supply unit and a vehicle seat according to an exemplary embodiment applied with the present disclosure, with reference to FIG. 1A to FIG. 9B. Note that in the drawings as appropriate, the arrow FR indicates the seat front direction, the arrow IN indicates the seat width direction inside, and the arrow UP indicates the seat upper direction of the vehicle seat. In the explanation of the present exemplary embodiment, the seat front direction, seat width direction inside, and seat upper direction are respectively aligned with the vehicle front direction, vehicle width direction inside, and vehicle upper direction of a vehicle assembled with the vehicle seat. Note that the directions in which the power supply unit and the vehicle seat are applied are not limited to those of the present exemplary embodiment.

Schematic Overall Configuration of Power Supply Unit 10 and Vehicle Seat 30

Figure 2:
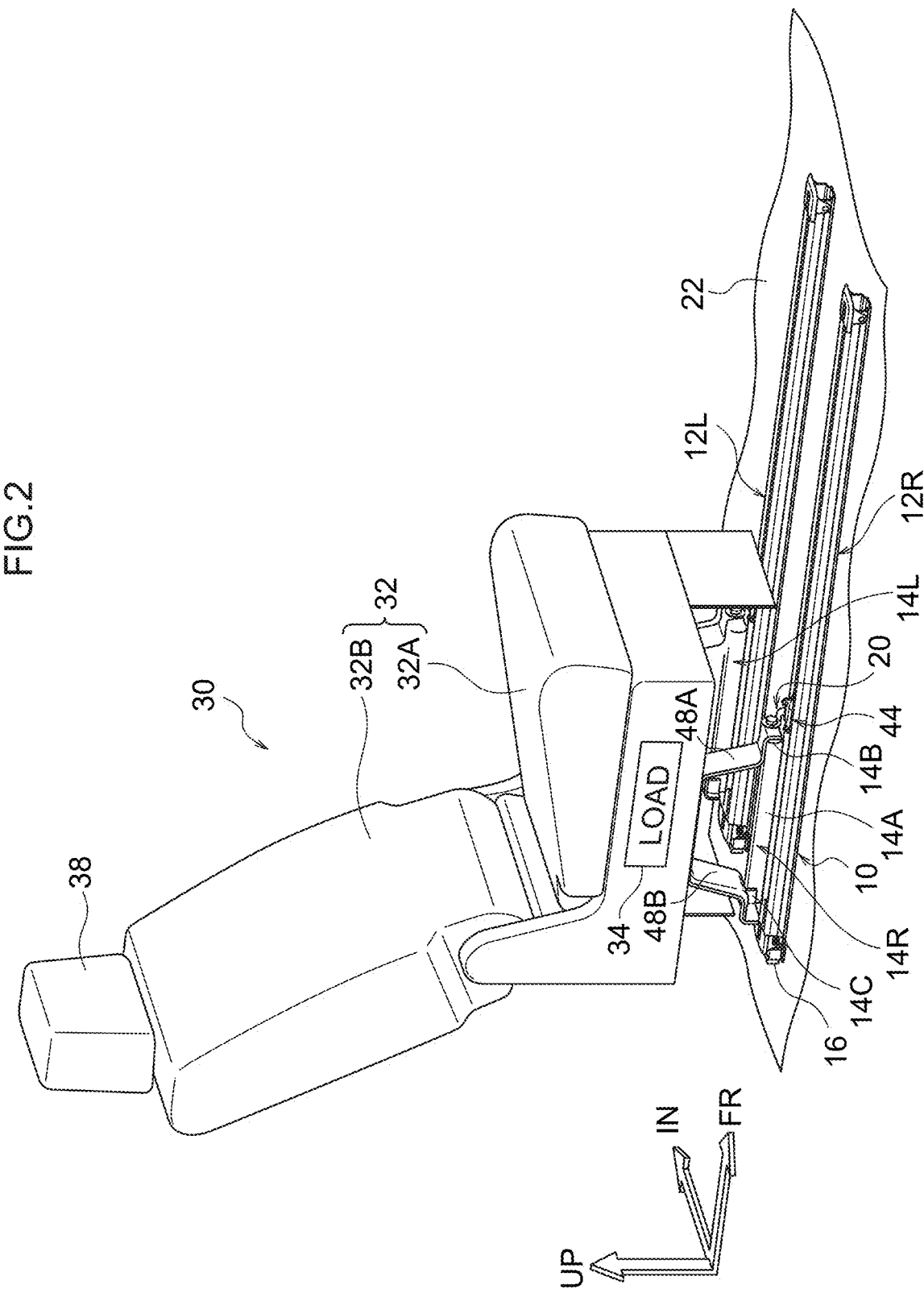
FIG. 2 is a perspective view illustrating an overall configuration of a vehicle seat including a power supply unit and a seat body according to an exemplary embodiment as viewed obliquely from the vehicle upper front.
Figure 3A:
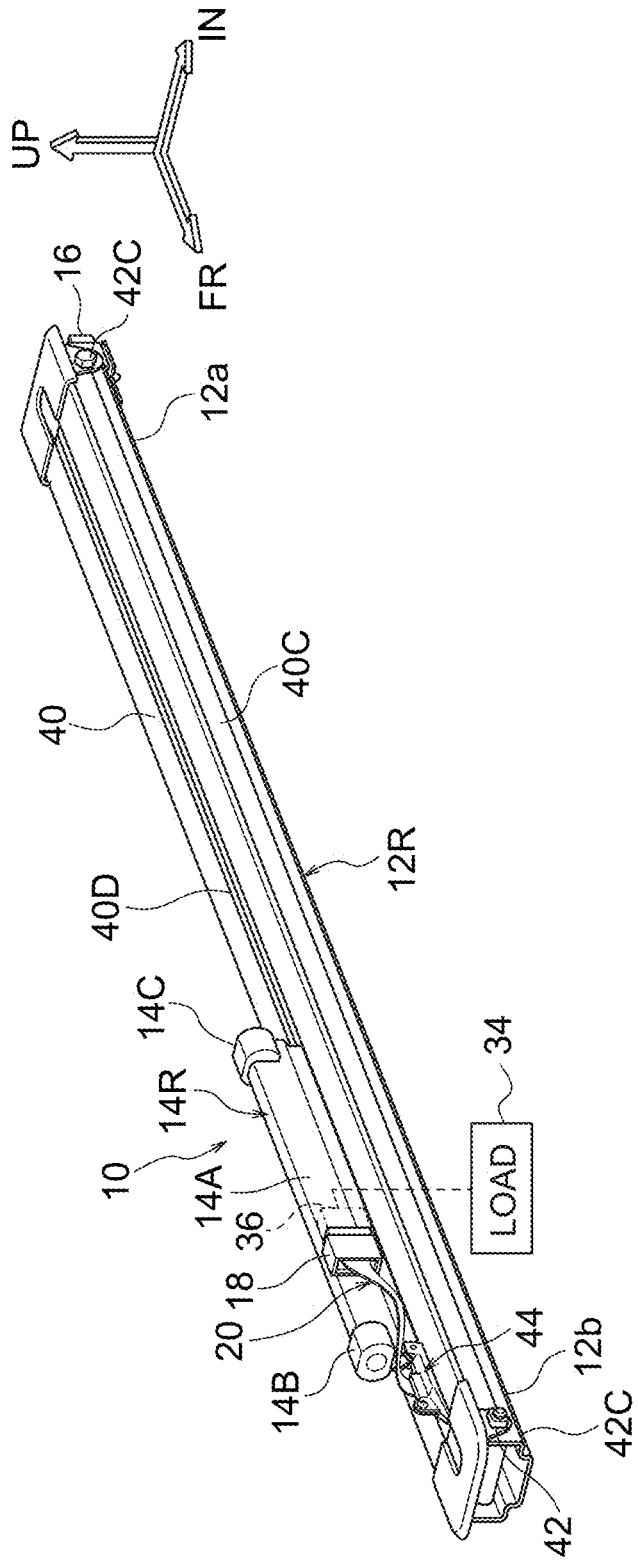
FIG. 3A is a perspective view illustrating an overall configuration of a power supply unit as viewed obliquely from the vehicle upper front.

As illustrated in FIG. 3A, a power supply unit 10 according to the present exemplary embodiment is configured including a slide rail 12R, a slider 14R, a first connector 16, a second connector 18, and a cable 20. The slide rail 12R extends with its length direction along the seat front-rear direction (a first direction) and is fixed to a floor (vehicle floor) 22, illustrated in FIG. 2, of a vehicle. The slider 14R is installed to the slide rail 12R and is capable of sliding in the seat front-rear direction. Detailed configuration of the power supply unit 10 including the slide rail 12R and the slider 14R is described later.

As illustrated in FIG. 2, a vehicle seat 30 according to the present exemplary embodiment is configured including two slide rails, these being the slide rail 12R and a slide rail 12L, two sliders, these being the slider 14R and a slider 14L, a seat body 32, and the power supply unit 10. The vehicle seat 30 according to the present exemplary embodiment is applied to a front seat assembled on the right side of the vehicle. The slide rail 12R and the slider 14R are thereby fixed to the right side of the floor 22, namely, to the seat width direction outside as viewed by an occupant (driver) in a seated state on the seat body 32. The slide rail 12L and the slider 14L are fixed to the left side of the floor 22, namely, at the seat width direction inside.

The seat body 32 is attached to the slider 14R at the seat width direction outside by an attachment bracket 48A disposed on the seat front side, and an attachment bracket 48B disposed on the seat rear side. The seat body 32 is similarly attached to the slider 14L at the seat width direction inside by attachment brackets for which reference numerals have been omitted. The seat body 32 is thereby attached to the slide rail 12R and the slide rail 12L through the slider 14R and the slider 14L so as to be capable of sliding in the seat front-rear direction. The vehicle seat 30 is configured as a sliding seat in which the seat front-rear direction position of the seat body 32 is adjustable.

The seat body 32 is configured including a cushion 32A on which the occupant sits, and a seatback 32B that is installed to a seat rear end portion of the cushion 32A through a reclining mechanism capable of pivoting in the seat front-rear direction. A headrest 38 is installed to an upper end portion of the seatback 32B. A load 34 that is driven by electric power supplied from the power supply unit 10 is provided to the seat body 32. As is simply illustrated in FIG. 3A, configuration is such that a third connector 36 installed on the side of the seat body 32 is connected to the load 34, and the third connector 36 is electrically connected to the second connector 18 installed to the slider 14R.

The load 34 is, for example, at least one of a drive source that moves the seat body 32 in the seat front-rear direction, a drive source that moves the cushion 32A in the seat up-down direction, or a drive source of the reclining mechanism that rotates the seatback 32B in the seat front-rear direction. An electric motor is employed as the drive source. The load 34 may alternatively be at least one out of a heater that adjusts the temperature of the seat body 32, a sensor that actuates various safety devices, an air conditioner, a television monitor, or a massage device.

Note that in the present exemplary embodiment, the vehicle seat 30 may also be applied to a front seat on the left side, or to a seat in a second or third row in a vehicle with three rows of seats attached, for example.

Detailed Configuration of Power Supply Unit 10

(1) Configuration of Slide Rail 12

The slide rail 12R and the slider 14R, and the slide rail 12L and the slider 14L are included as configuration elements of the vehicle seat 30. In the present exemplary embodiment as illustrated in FIG. 2, the slide rail 12R and the slider 14R disposed on the floor 22 at the seat width direction outside are also employed as parts of the configuration elements of the power supply unit 10. In the following explanation of the power supply unit 10, the slide rail 12R is sometimes simply referred to as "slide rail 12" and the slider 14R is sometimes simply referred to as "slider 14".

As illustrated in FIG. 1A to FIG. 1C, FIG. 2, FIG. 3A, and FIG. 4, a cross-section profile of the slide rail 12 of the power supply unit 10 in the seat width direction (a second direction) intersecting the seat front-rear direction is formed in a U-shape. Note that the seat width direction is a direction orthogonal to the seat front-rear direction.

Figure 1B:
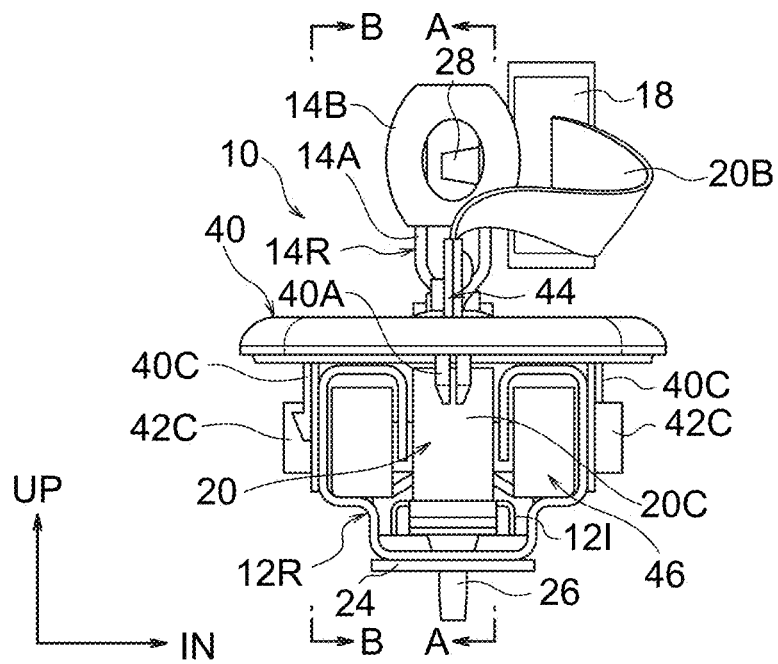
FIG. 1B is a face-on view of the power supply unit viewed from the vehicle front side.
Figure 1C:
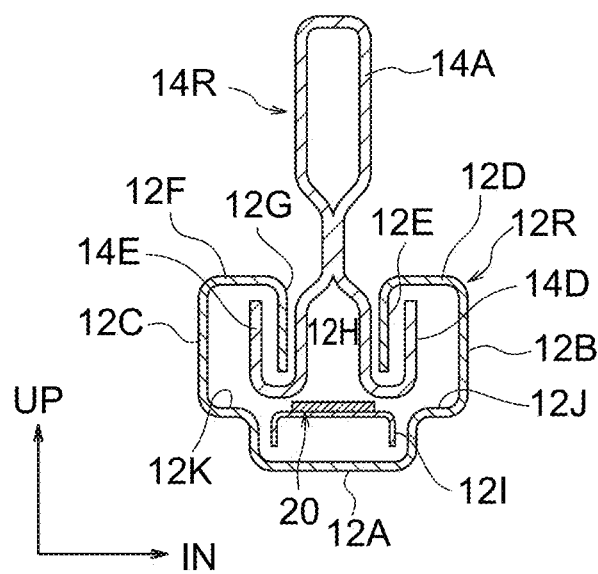
FIG. 1C is a cross-section of relevant portions including a slide rail, a slider, and a cable of the power supply unit as viewed from the same direction as FIG. 1B.

Detailed explanation follows regarding the cross-section profile of the slide rail 12, with reference to FIG. 1B and FIG. 1C. The slide rail 12 includes a bottom wall 12A, a side wall 12B and a side wall 12C configuring a pair, a top wall 12D and a top wall 12F configuring a pair, an open side wall 12E and an open side wall 12G configuring a pair, and an opening 12H. The bottom wall 12A has its thickness direction in the seat up-down direction (a third direction) and is formed in an elongated plate shape with its length direction along the seat front-rear direction. Note that the seat up-down direction is a direction orthogonal to the seat front-rear direction and the seat width direction.

Of these pairs, the one side wall 12B projects toward the seat width direction inside from a seat width direction inside end portion of the bottom wall 12A, and is formed in an elongated plate shape with its thickness direction in the seat width direction and its length direction along the seat front-rear direction. A seat upper direction end portion of the side wall 12B is bent toward the seat width direction outside to form the one top wall 12D. A seat width direction outside end portion of the top wall 12D is bent in the seat lower direction to form the one open side wall 12E. The side wall 12B, the top wall 12D, and the open side wall 12E collectively form a C-shaped cross-section profile open toward the seat lower side.

Of these pairs, the other side wall 12C projects toward the seat width direction outside from a seat width direction outside end portion of the bottom wall 12A and is formed in an elongated plate shape similarly to the side wall 12B. A seat upper direction end portion of the side wall 12C is bent toward the seat width direction inside to form the other top wall 12F. A seat width direction inside end portion of the top wall 12F is bent in the seat lower direction to form the other open side wall 12G. The side wall 12C, the top wall 12F, and the open side wall 12G also collectively form a C-shaped cross-section profile open toward the seat lower side, similarly to the side wall 12B, the top wall 12D, and the open side wall 12E.

Note that the one open side wall 12E is spaced apart from the other open side wall 12G in the seat width direction and is disposed facing the open side wall 12G. The opening 12H is thereby formed between the open side wall 12E and the open side wall 12G at the upper side of the slide rail 12. The opening 12H has its length direction along the seat front-rear direction and its opening width direction along the seat width direction. Note that the slide rail 12 is formed by molding a metal or resin material, and respective locations thereon, such as the bottom wall 12A, are integrally formed.

A reinforcing bracket 12I is provided inside the slide rail 12, extending along the seat front-rear direction so as to cover the bottom wall 12A. The reinforcing bracket 12I is a metal plate member with its thickness direction in the seat up-down direction. Both seat width direction end portions thereof are bent toward the seat lower side to form flanges. The mechanical strength of the slide rail 12 is enhanced by the reinforcing bracket 12I.

(2) Configuration of First Connector 16

As illustrated in FIG. 1A, FIG. 3A, FIG. 3B, FIG. 4, and FIG. 5A, the first connector 16 is fixed to a seat rear side end portion forming one end portion 12a of the slide rail 12. The first connector 16 is configured including bottomed, angular tube shaped resin housing with its connector width direction along the seat width direction, its connector height direction along the seat up-down direction, and its connector length direction along the seat front-rear direction. In a seat rear view, the first connector 16 is formed in a rectangular shape with its length direction along the seat width direction, and is what is referred to as laterally disposed. Plural, non-illustrated male or female connection terminals (contact pins) are arranged inside the housing of the first connector 16. The first connector 16 is configured electrically connected to a power supply source such as an onboard battery by a non-illustrated cable and connector.

Figure 5A:
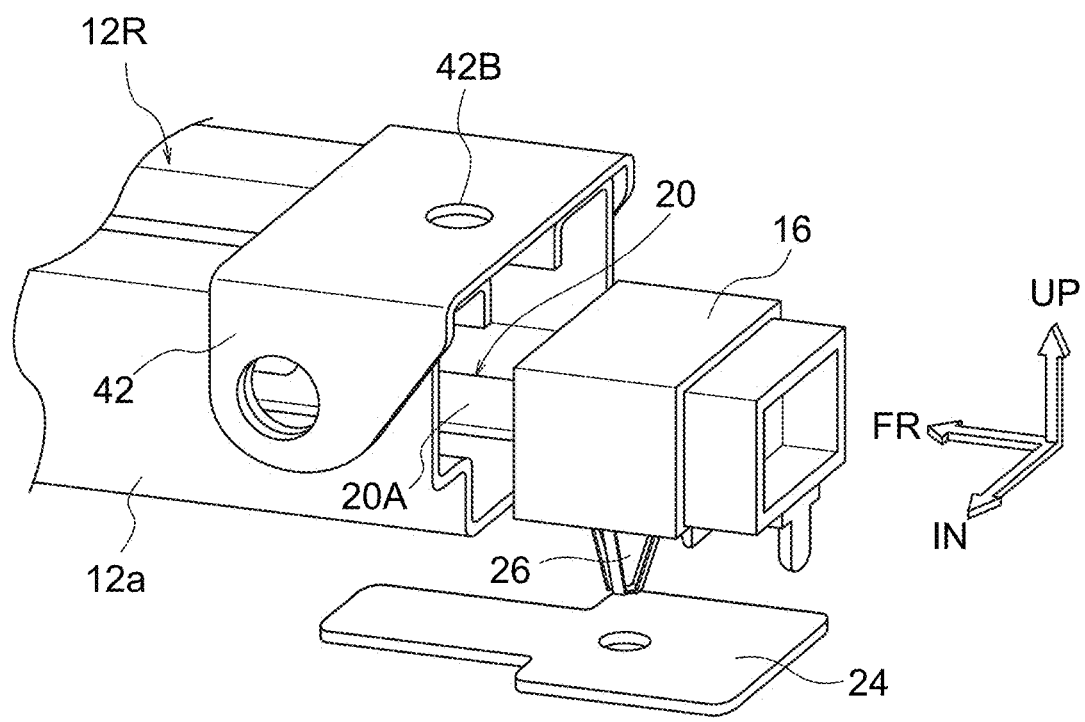
FIG. 5A is an enlarged perspective view of relevant portions including a slide rail, a cable, and a first connector of the power supply unit illustrated in FIG. 1A, as viewed obliquely from the vehicle upper rear side.

As illustrated in FIG. 1A, FIG. 1B, and FIG. 5A, the first connector 16 is attached to a metal attachment bracket 24 using a resin anchor clip 26. The attachment bracket 24 is fixed to the slide rail 12 illustrated in FIG. 2 by spot welding, or a fastening member such as a screw or bolt.

(3) Configuration of Slider 14

Figure 4:
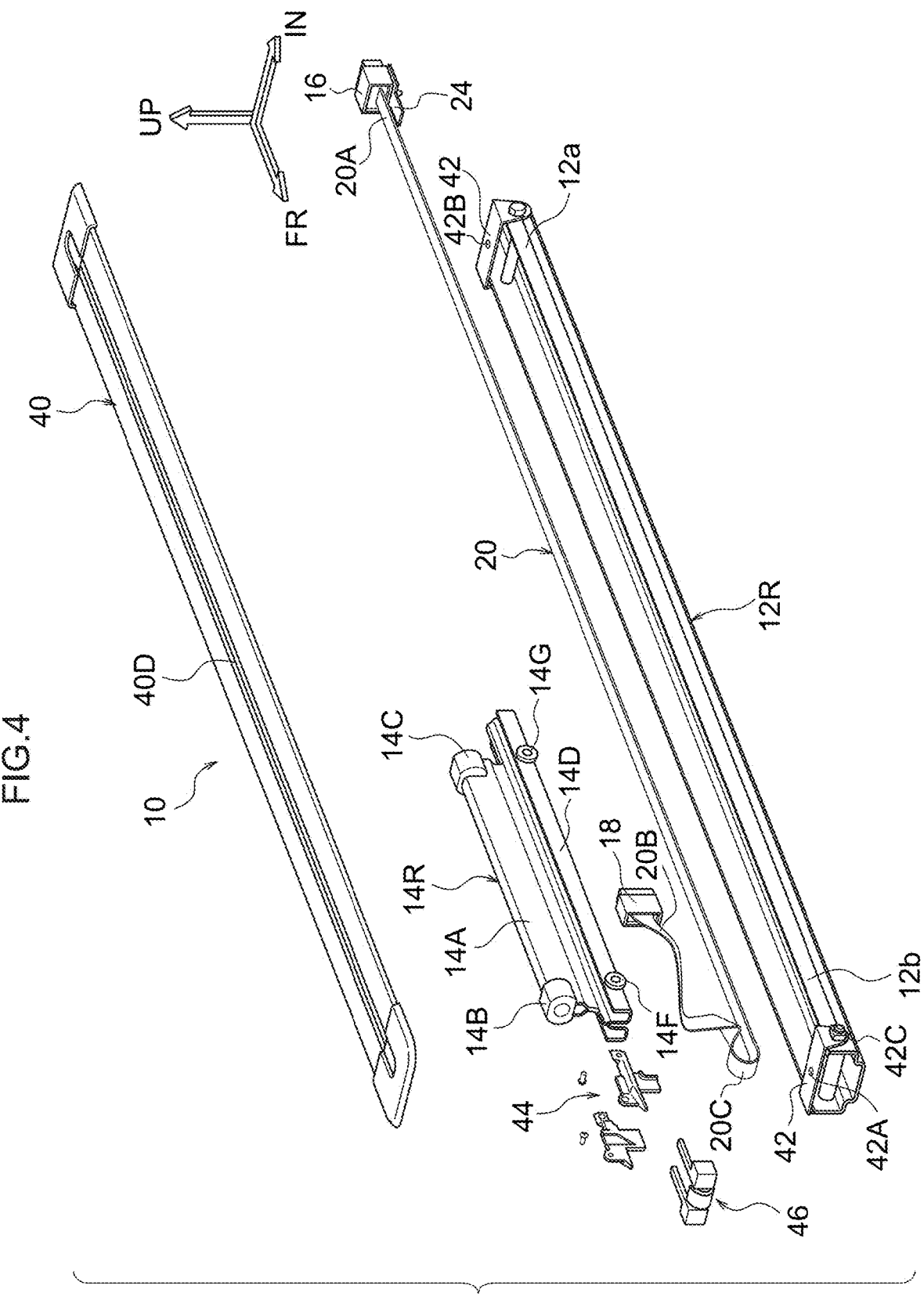
FIG. 4 is an exploded perspective view of the power supply unit as viewed from the same direction as FIG. 3A.

As illustrated in FIG. 1C, FIG. 3B, and FIG. 4, the slider 14 is configured including a slider body 14A, a coupling portion 14B and a coupling portion 14C, a slider portion 14D and a slider portion 14E, and rollers 14F and rollers 14G.

As illustrated in FIG. 1B, FIG. 1C, FIG. 3A, FIG. 3B, and FIG. 4, the slider body 14A is formed in a substantially rectangular tube shape that is hollow along the seat front-rear direction, and has its slider length direction along the seat front-rear direction, its slider height direction along the seat up-down direction, and its slider width direction along the seat width direction. The slider body 14A is disposed further toward the seat upper side than the slide rail 12, and is configured herein so as to have its slider width contained within an opening width of the opening 12H of the slide rail 12.

The coupling portion 14B is integrally formed to a seat front side end portion of the slider body 14A. The coupling portion 14B is formed in a substantially elliptical tube shape including a through-hole (not given a reference numeral) piercing through in the seat front-rear direction, and the thickness of the coupling portion 14B from its external diameter to the through-hole is formed thicker than the thickness of the slider body 14A. The coupling portion 14C is integrally formed to a seat rear side end portion of the slider body 14A, and is also formed in a thicker, substantially elliptical tube shape including a through-hole, similarly to the coupling portion 14B. As illustrated in FIG. 2, the coupling portion 14B is fixed to the cushion 32A of the seat body 32 by the attachment bracket 48A, and the coupling portion 14C is fixed to the cushion 32A by the attachment bracket 48B. Fastening members such as bolts, not given reference numerals, are used for the fixing.

As illustrated in FIG. 1C, the slider portion 14D and the slider portion 14E configure a pair disposed on the left and right in the seat width direction, and are integrally formed to a seat lower side end portion of the slider body 14A. The one slider portion 14D is disposed at the seat width direction inside, sandwiches the open side wall 12E of the slide rail 12, and is formed with a U-shaped cross-section profile open toward the seat upper side. The other slider portion 14E is disposed further toward the seat width direction outside than the slider portion 14D, sandwiches the open side wall 12G of the slide rail 12, and is formed with a U-shaped cross-section profile open toward the seat upper side similarly to the slider portion 14E. Namely, the slider portion 14D is guided by the open side wall 12E and the slider portion 14E is guided by the open side wall 12G, such that the slider 14 slides in the seat front-rear direction along the slide rail 12.

As illustrated in FIG. 3B and FIG. 4, the roller 14F is rotatably installed inside the slide rail 12, at a seat front side end portion of the slider portion 14D. Although hidden by the slider body 14A and so on in the drawings, a roller 14F is also rotatably installed to the slider portion 14E, and so the rollers 14F are disposed as a pair in the seat width direction. The roller 14G is rotatably installed inside the slide rail 12, at a seat rear side end portion of the slider portion 14D. A roller 14G is also rotatably installed to the slider portion 14E, and so the rollers 14G are disposed as a pair in the seat width direction similarly to the rollers 14F.

The roller 14F and the roller 14G disposed at the seat width direction inside abut an inner wall 12J, this being a step portion between the bottom wall 12A and the side wall 12B of the slide rail 12 illustrated in FIG. 1C, and are configured so as to be capable of moving by rotating in the seat front-rear direction along the inner wall 12J. The roller 14F and the roller 14G disposed at the seat width direction outside abut an inner wall 12K, this being a step portion between the bottom wall 12A and the side wall 12C of the slide rail 12, and are configured so as to be capable of moving by rotating in the seat front-rear direction along the inner wall 12K. This enables the slider 14 to slide smoothly in the seat front-rear direction along the opening 12H of the slide rail 12.

The slider body 14A, the coupling portion 14B, the coupling portion 14C, the slider portion 14D, and the slider portion 14E of the slider 14 are integrally formed by molding a resin or metal material, for example. Resin or rubber rollers, for example, are employed as the rollers 14F and the rollers 14G.

(4) Configuration of Second Connector 18

As illustrated in FIG. 1B, FIG. 3A, FIG. 3B, FIG. 4, and FIG. 5B, the second connector 18 is fixed to a seat front-rear direction intermediate portion of the slider body 14A of the slider 14. The second connector 18 is configured including bottomed, angular tube shaped resin housing with its connector width direction along the seat up-down direction, its connector height direction along the seat width direction, and its connector length direction along the seat front-rear direction. In a seat rear view, the second connector 18 is formed in a rectangular shape with its length direction along the seat up-down direction and is what is referred to as vertically disposed, being rotated 90 degrees with respect to the first connector 16 about a central axis along the seat front-rear direction. The configuration of the second connector 18 is similar to the configuration of the first connector 16.

As illustrated in FIG. 1B, the second connector 18 is attached to the slider body 14A using a resin anchor clip 28. Note that the second connector 18 is attached to a side wall (not given a reference numeral) on the seat width direction inside of the slider body 14A, such the second connector 18 is not easily visible from the seat width direction outside.

(5) Configuration of Cable 20

As illustrated in FIG. 1A, FIG. 3B, and FIG. 4, the cable 20 is housed inside the slide rail 12 with its length direction along the seat front-rear direction. To explain in detail, as illustrated in FIG. 1A, FIG. 3B, FIG. 4, and FIG. 5A, one end 20A on the seat rear side of the cable 20 is electrically connected to the first connector 16. As illustrated in FIG. 1A, FIG. 1B, FIG. 3B, FIG. 4, and FIG. 5B, the cable 20 is folded back at a length direction intermediate portion 20C thereof, and another end 20B on the seat front side of the cable 20 is electrically connected to the second connector 18.

Figure 9A:
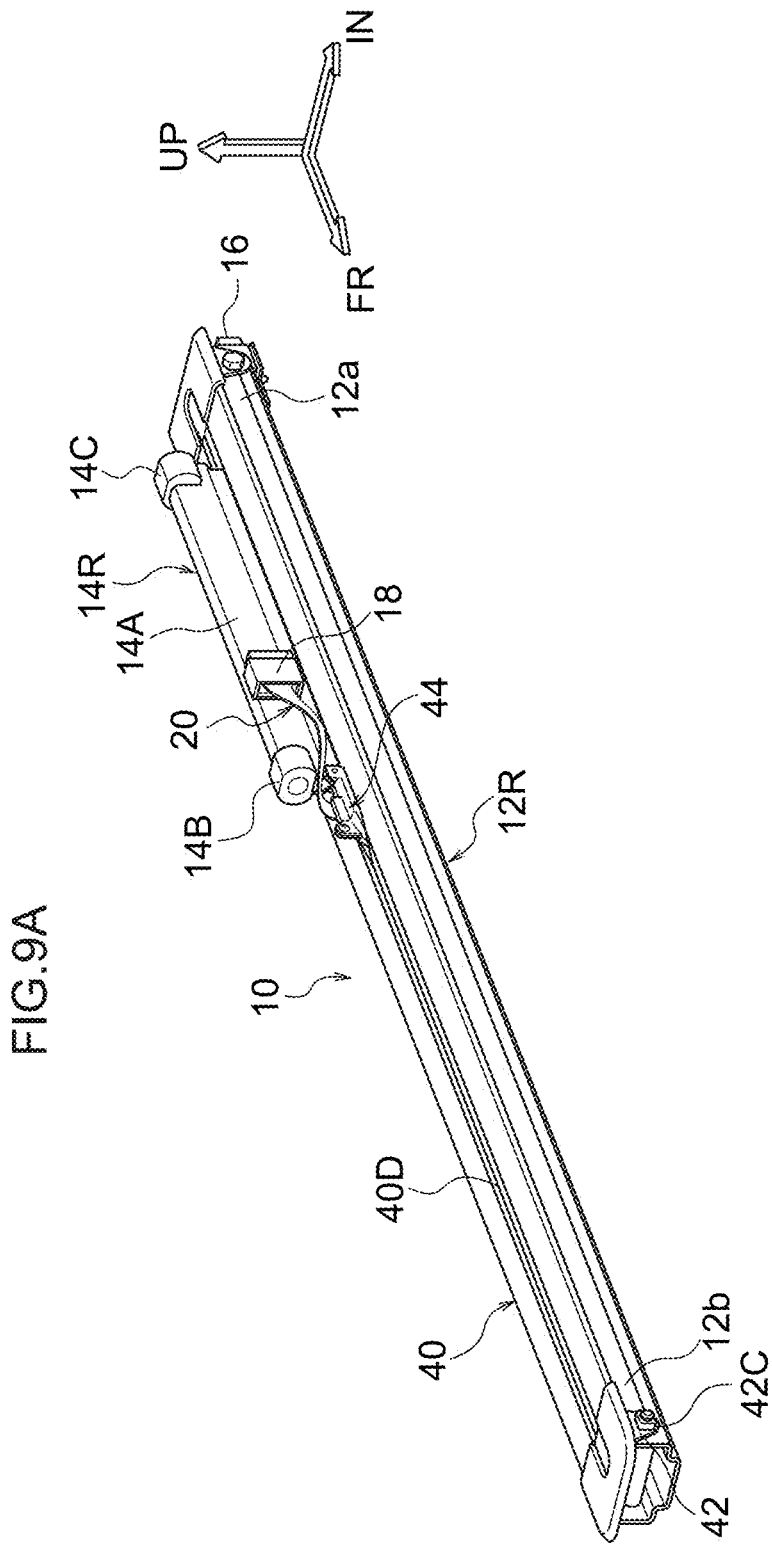
FIG. 9A is a perspective view corresponding to FIG. 3A, illustrating an overall configuration of the power supply unit in a state in which the slider has been moved toward the vehicle rear side.
Figure 9B:
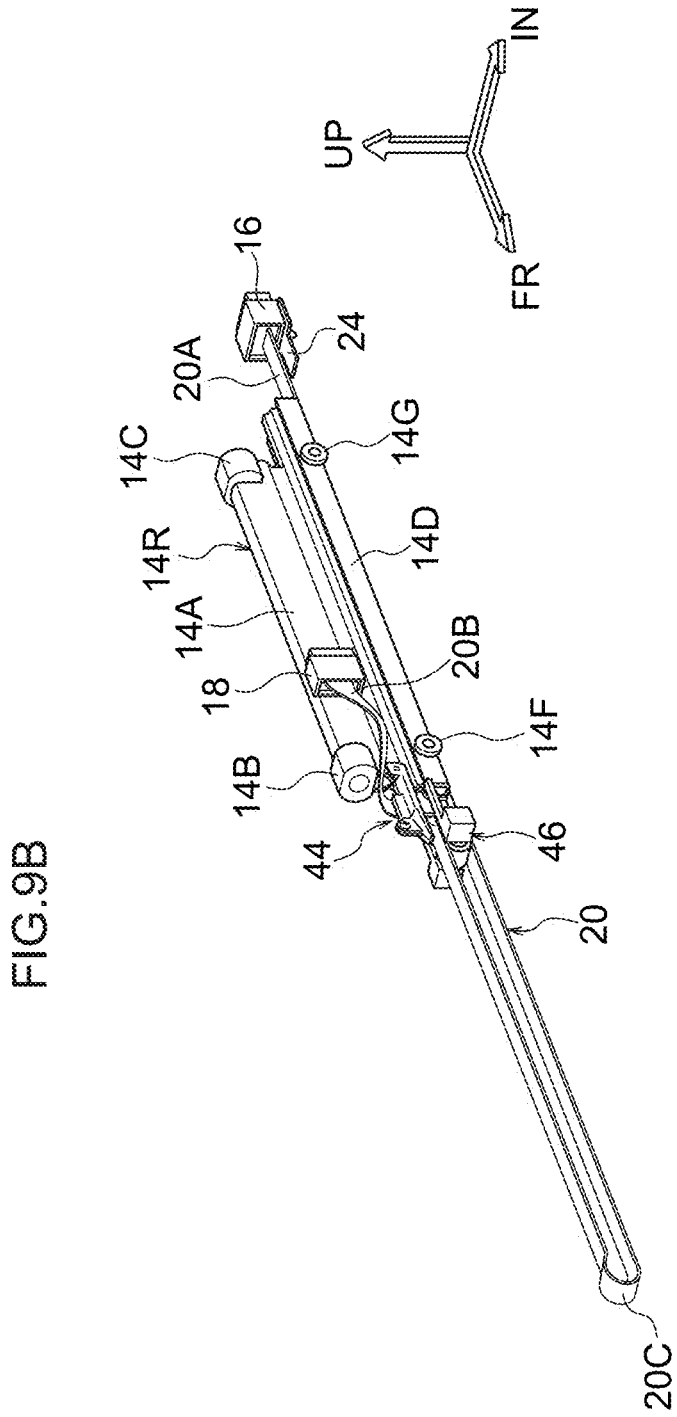
FIG. 9B is a perspective view corresponding to FIG. 3B, illustrating relevant portions including the slider and the cable of the power supply unit.

As illustrated in FIG. 1C, from the one end 20A to the intermediate portion 20C, the cable 20 is laid on the surface of the reinforcing bracket 12I with its cable width direction along the seat width direction. The position of the intermediate portion 20C varies according to the slide position of the slider 14. As illustrated in FIG. 3A and FIG. 3B, for example, the intermediate portion 20C is positioned at the seat front side when the slider 14 is positioned at the seat front side. Conversely, as illustrated in FIG. 9A and FIG. 9B, the intermediate portion 20C is positioned at the seat rear side when the slider 14 is positioned at the seat rear side.

A flexible flat cable (FFC) is employed as the cable 20. The flexible flat cable is formed by copper or copper alloy wiring with a flat cross-section profile and excellent conductivity covered in a flexible insulator. A flexible flat cable with a single core structure, or a multi-core structure in which plural wires are arranged in a wiring width direction, is employed as required. A flexible flat cable is thinner than a round cable, enabling sufficient space to be secured at the seat upper side inside the slide rail 12 even when the cable is housed inside the slide rail 12, such that there is no impairment to the sliding of the slider 14. Note that a flexible printed circuit (FPC) may be employed as the cable 20 instead of the flexible flat cable.

(6) Configuration of Rail Cover 40

As illustrated in FIG. 1A, the power supply unit 10 is also configured including a rail cover 40, a cable guide 44, and a cable supporter 46. Note that the rail cover 40 is explained here, and the cable guide 44 and the cable supporter 46 are explained later.

As illustrated in FIG. 1A, FIG. 1B, FIG. 3A, FIG. 4, and FIG. 5B, the rail cover 40 is formed in a plate shape with its length direction along the seat front-rear direction, its cover width direction along the seat width direction, and its thickness direction in the seat up-down direction. The rail cover 40 is installed above the top wall 12D and the top wall 12F of the slide rail 12 so as to block the opening 12H. The rail cover 40 is formed using a flexible resin material, for example.

To explain in detail, as illustrated in FIG. 1A, FIG. 1B, and FIG. 4, a seat front side end portion of the rail cover 40 is fixed to another end portion 12b of the slide rail 12 by an attachment bracket 42. Hook shaped anchor portions 40A that project toward the seat lower side from a back face of the rail cover 40 are integrally formed to a seat width direction intermediate portion of a seat front side end portion of the rail cover 40. The attachment bracket 42 extends across the slide rail 12 from the side wall 12B, across the top wall 12D and the top wall 12F, and as far as the side wall 12C (see FIG. 1C), and is formed using a metal plate member with an inverted U-shaped profile in a seat front view. As illustrated in FIG. 1B and FIG. 4, the attachment bracket 42 is fixed to both the side wall 12B and the side wall 12C of the slide rail 12 using fastening members 42C such as bolts. As illustrated in FIG. 4, an anchoring portion 42A is formed piercing in the seat up-down direction through a seat width direction intermediate portion of the attachment bracket 42. Namely, the seat front side end portion of the rail cover 40 is installed by anchoring (fitting) the anchor portions 40A to the anchoring portion 42A of the attachment bracket 42.

As illustrated in FIG. 1A, FIG. 4, and FIG. 5A, a seat rear side end portion of the rail cover 40 is similarly fixed to the one end portion 12a of the slide rail 12 by an attachment bracket 42. Anchor portions 40B that are similar to the anchor portions 40A are integrally formed in the seat rear side end portion of the rail cover 40. An anchoring portion 42B (see FIG. 5A) is formed piercing in the seat up-down direction through a seat width direction intermediate portion of the attachment bracket 42. Namely, the seat rear side end portion of the rail cover 40 is installed by anchoring the anchor portions 40B to the anchoring portion 42B of the attachment bracket 42.

As illustrated in FIG. 1B, FIG. 3A, and FIG. 4, a side portion 40C is integrally formed to the rail cover 40 so as to protrude toward the seat lower side along the side wall 12B of the slide rail 12 from a back face at the seat width direction inside of the rail cover 40. A side portion 40C is similarly formed so as to protrude toward the seat lower side along the side wall 12C from the back face at the seat width direction outside of the rail cover 40. The pair of side portions 40C are configured so as to sandwich the slide rail 12 from both seat width sides, suppressing the rail cover 40 from slipping in the seat width direction, and increasing the contact force of the rail cover 40 to the slide rail 12.

As illustrated in FIG. 7B to FIG. 7E, a slit 40D with a variable slit width is formed piercing through a seat width direction intermediate portion of the rail cover 40 in the thickness direction and extending along the seat front-rear direction. The slider 14 that slides along the seat front-rear direction and the other end 20B of the cable 20 that slides so as to follow the sliding of the slider 14 pass through the slit 40D. Note that the other end 20B of the cable 20 has its width direction along the front-rear direction, and passes into the slide rail 12 from the outside of the slide rail 12 through the slit 40D.

Figure 7A:
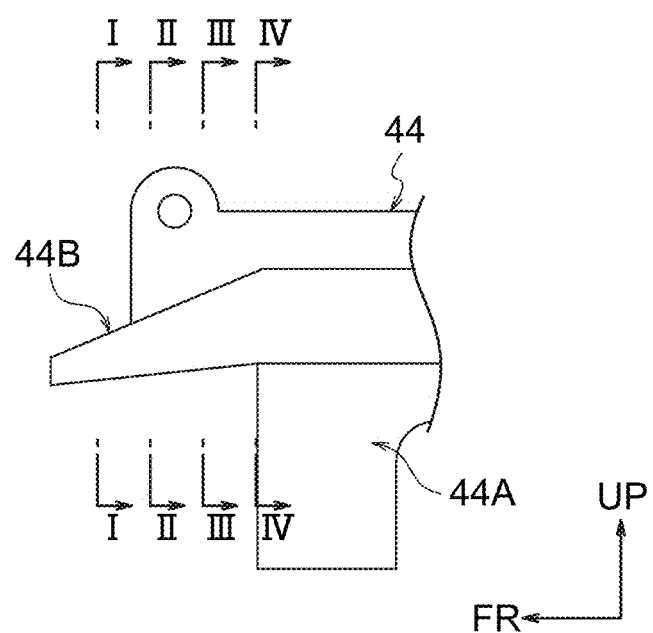
FIG. 7A is an enlarged side view of relevant portions of the cable guide illustrated in FIG. 6A and FIG. 6B, and FIG. 7B to FIG. 7E are cross-sections of the cable guide and a rail cover respectively sectioned along line I-I, line II-II, line and line IV-IV illustrated in FIG. 7A.
Figure 7B:
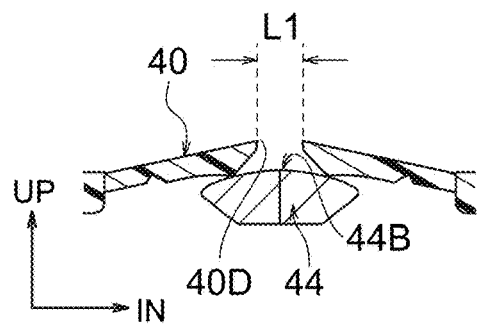
Figure 7C:
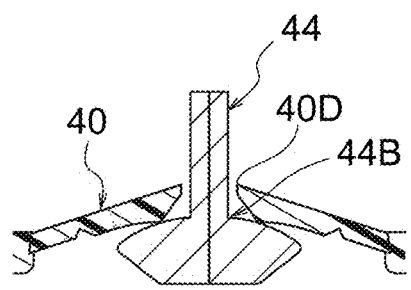
Figure 7D:
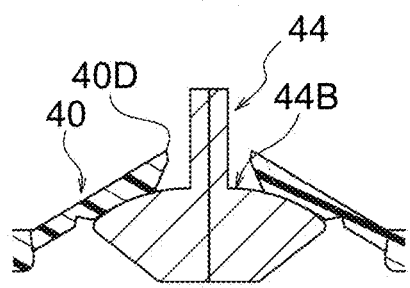
Figure 7E:
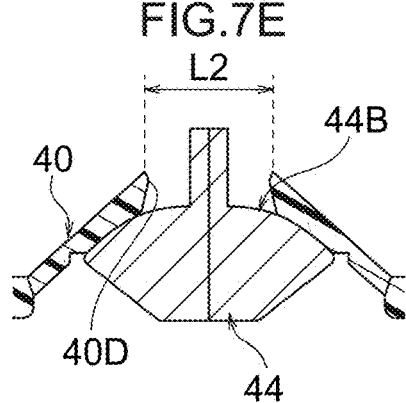

As illustrated in FIG. 7B, the slit 40D has a minimum slit width L1 when the slider 14 and the cable 20 accompanying sliding of the slider 14 is not passing through. The minimum slit width L1 is set from 2.5 mm to 3.5 mm, for example. As illustrated in FIG. 7E, the slit 40D has a maximum slit width L2 when the slider 14 and the cable 20 accompanying sliding of the slider 14 pass through. The maximum slit width L2 is set from 9.0 mm to 9.5 mm, for example.

(7) Configuration of Cable Guide 44

Figure 6A:
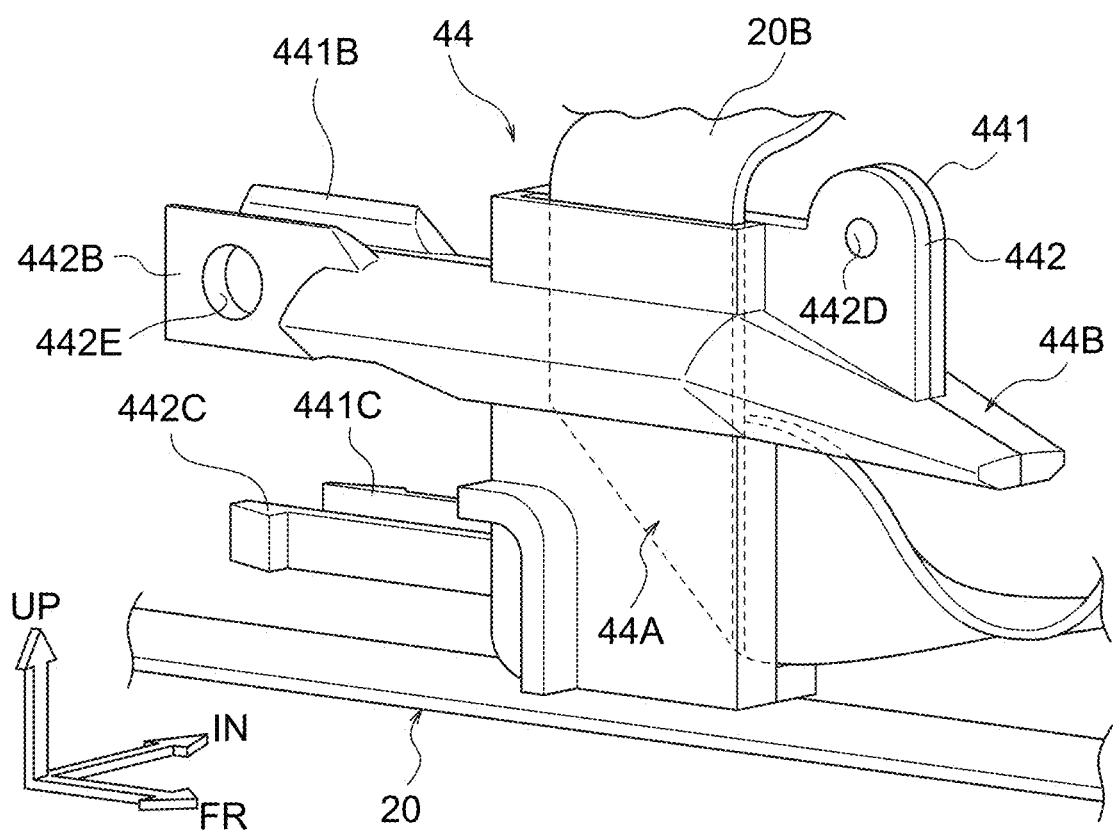
FIG. 6A is an enlarged perspective view of relevant portions including a cable guide and the cable of the power supply unit illustrated in FIG. 1A, as viewed obliquely from the vehicle front side and somewhat toward upper side.

As illustrated in FIG. 1A, FIG. 5B, FIG. 6A, and FIG. 6B, the cable guide 44 is installed at the seat front side of the slider 14. As illustrated in FIG. 6A and FIG. 6B in particular, the cable guide 44 is formed by superimposing in the seat width direction two guide pieces that have left-right symmetry to each other and are each formed by a substantially T-shaped plate member in a side-on view, these being a first guide piece 441 and a second guide piece 442. A positioning hole 441A is provided as a recess in a seat front-rear direction intermediate portion that is also a seat up-down direction intermediate portion of the first guide piece 441. A positioner projection 442A is projects out from the second guide piece 442 at a position corresponding to the positioning hole 441A. The positioning hole 441A and the positioner projection 442A are fitted together and the first guide piece 441 and the second guide piece 442 are fastened together using a fastening member 44C and a fastening member 44D as illustrated in FIG. 1A and FIG. 5B.

The fastening member 44C is inserted through a fastening hole 441D formed piercing through a seat front side end portion of the first guide piece 441 in the seat width direction, and through a fastening hole 442D formed piercing through the second guide piece 442 in the seat width direction at a position corresponding to the fastening hole 441D. A screw, for example, is employed as the fastening member 44C. The fastening member 44D is inserted through a fastening hole 441E formed piercing through a seat rear side end portion of the first guide piece 441 in the seat width direction, and through a fastening hole 442E formed piercing through the second guide piece 442 in the seat width direction at a position corresponding to the fastening hole 441E. The fastening member 44D is also inserted through a non-illustrated fastening hole formed piercing through a seat front side end portion of the slider body 14A illustrated in FIG. 1A in the seat width direction. Namely, the fastening member 44D sandwiches and fastens together the slider body 14A between the first guide piece 441 and the second guide piece 442. A bolt and nut, for example, are employed as the fastening member 44D.

As illustrated in FIG. 6A, a pair configured by an anchor portion 441C and an anchor portion 442C are provided to the cable guide 44 so as to be alongside each other in the seat width direction. The anchor portion 441C protrudes toward the seat rear side from a seat rear side end portion of the first guide piece 441, and a seat rear side end portion of the anchor portion 441C projects toward the seat width direction inside so as to form an L-shape in plan view. The anchor portion 441C is integrally formed to the first guide piece 441. The anchor portion 441C is configured to engage with an engaging portion 14H formed in a seat front side end portion of the slider portion 14D as illustrated in FIG. 1A, and to couple the cable guide 44 to the slider 14. The anchor portion 442C protrudes toward the seat rear side parallel to the anchor portion 441C from a seat rear side end portion of the second guide piece 442, and a seat rear side end portion of the anchor portion 442C projects toward the seat width direction outside so as to form an L-shape facing the opposite direction to the anchor portion 441C. The anchor portion 442C is integrally formed to the second guide piece 442. Although not illustrated in the drawings, the anchor portion 442C is configured to engage with an engaging portion formed in the slider portion 14E (see FIG. 1C) so as to correspond to the engaging portion 14H, and to couple the cable guide 44 to the slider 14.

As illustrated in FIG. 6A and FIG. 6B, the cable guide 44 is also configured including a deflecting guide portion 44A and a width adjuster portion 44B. The deflecting guide portion 44A includes a lead-in location 44A1 and a lead-out location 44A2. As illustrated in FIG. 6B, the lead-in location 44A1 is formed at the seat width direction outside of the first guide piece 441, opens toward the seat front side, and is recessed in a substantially triangular shape in side view. The lead-in location 44A1 is configured so as to change the cable width direction of a location 20D of the cable 20 directly after the folded-back intermediate portion 20C from the seat width direction to the seat up-down direction and to lead the location 20D from the seat front side. The lead-out location 44A2 is formed at the seat width direction inside of the second guide piece 442, opens toward the seat upper side, and is recessed in a substantially trapezoidal shape in side view. The lead-out location 44A2 is configured so as to bend the location 20D led by the lead-in location 44A1 toward the seat upper direction, to change the cable width direction from the seat up-down direction to the seat front-rear direction, and to lead out the location 20D in the seat upper direction. Expressed in other words, the deflecting guide portion 44A grips the cable 20, aligns the width direction of the cable 20 with the length direction of the slit 40D, and inserts the cable 20 into the slide rail 12 from the outside of the slide rail 12. The deflecting guide portion 44A then bends the cable 20 inside the slide rail 12 and changes the orientation of the thickness direction of the cable 20 to the seat up-down direction.

As illustrated in FIG. 6A, FIG. 6B, and FIG. 7A, the width adjuster portion 44B is integrally formed to a seat front side end portion of the cable guide 44. To explain in detail, the width adjuster portion 44B is formed in a fan shape gradually widening from the seat front side toward the seat rear side, and is formed with a curving sloped face profile with an upper face that gradually rises from inside the slide rail 12 toward the slide rail outside so as to project toward the seat upper side.

As illustrated in FIG. 7B, at a slide position corresponding to line I-I at the seat front side of the width adjuster portion 44B illustrated in FIG. 7A, the rail cover 40 is barely pushed upward by the width adjuster portion 44B, and so the slit width of the slit 40D of the rail cover 40 is the minimum slit width L1. As illustrated in FIG. 7C, at a slide position corresponding to line II-II that is further toward the seat rear side of the width adjuster portion 44B than the slide position along line I-I, the rail cover 40 starts to be pushed upward by the width adjuster portion 44B, and so the slit width of the slit 40D of the rail cover 40 widens. As illustrated in FIG. 7D, at a slide position corresponding to line toward the seat rear side of the width adjuster portion 44B, the pushing upward of the rail cover 40 by the width adjuster portion 44B becomes more evident, and so the slit width of the slit 40D of the rail cover 40 widens further. As illustrated in FIG. 7E, at a slide position corresponding to line IV-IV at the seat rear side of the width adjuster portion 44B, the pushing upward of the rail cover 40 by the width adjuster portion 44B is at its maximum, and so the slit width of the slit 40D of the rail cover 40 is the maximum slit width L2. Namely, the width adjuster portion 44B is capable of adjusting the slit 40D between widening to the maximum slit width L2 when the cable 20 together with the cable guide 44 pass through the slit 40D accompanying sliding of the slider 14, and the minimum slit width L1 which is narrower than the maximum slit width L2 when the cable 20 is not passing through the slit 40D.

(8) Configuration of Cable Supporter 46

As illustrated in FIG. 1A, FIG. 1B, FIG. 3B, FIG. 4, and FIG. 8A to FIG. 8D, the cable supporter 46 is installed to the slider 14. To explain in detail, as illustrated in FIG. 8A to FIG. 8D in particular, the cable supporter 46 is configured including a fold-back support portion 46A, supporter slide portions 46B, and coupling anchor portions 46C. The fold-back support portion 46A is formed by a plate member with its length direction along the seat front-rear direction and its thickness direction in the seat up-down direction, a seat rear side end portion thereof being made to project toward the seat front side and then bend back in a curved shape so as to form a J shape in side view. The fold-back support portion 46A is disposed to the inside of the intermediate portion 20C of the folded-back cable 20 inside the slide rail 12, and the cable 20 is entrained around the fold-back support portion 46A. The fold-back support portion 46A is formed by molding a metal or resin material that has low friction against the cable 20 so as to push the one end 20A of the cable 20 toward the reinforcing bracket 12I (see FIG. 1B and FIG. 1C) such that the intermediate portion 20C is folded back smoothly.

A pair of the supporter slide portions 46B are integrated with or integrally formed to both seat width direction end portions of the fold-back support portion 46A. The supporter slide portions 46B are each formed in a rectangular block shape. The supporter slide portion 46B on the seat width direction inside is configured so as to slide in the seat front-rear direction along the inner wall 12J within a region with a periphery enclosed by the side wall 12B, the top wall 12D, and the open side wall 12E of the slide rail 12 illustrated in FIG. 1B and FIG. 1C. The supporter slide portion 46B on the seat width direction outside is configured so as to slide in the seat front-rear direction along the inner wall 12K within a region with a periphery enclosed by the side wall 12C, the top wall 12F, and the open side wall 12G of the slide rail 12.

Figure 8A:
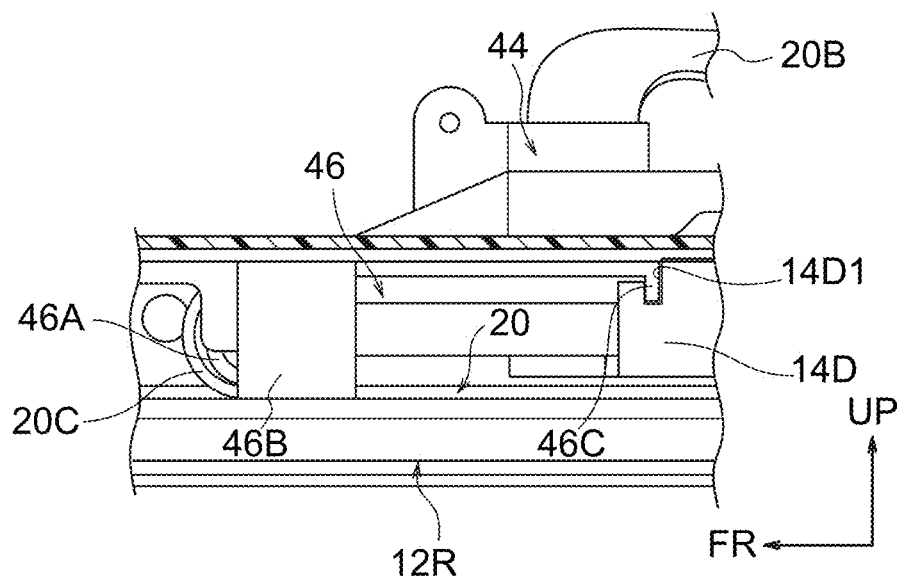
FIG. 8A is an enlarged side view (a cross-section sectioned along line B-B in FIG. 1B) of relevant portions including a cable supporter of the power supply unit illustrated in FIG. 1A.
Figure 8B:
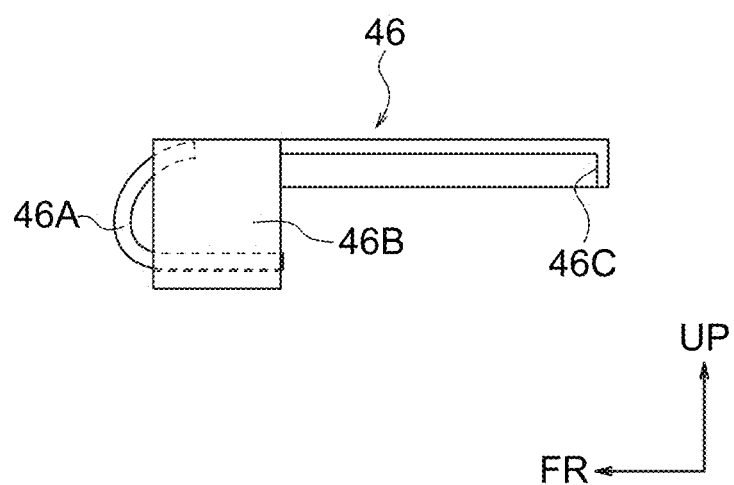
FIG. 8B is enlarged side view of the cable supporter illustrated in FIG. 8A in isolation.
Figure 8C:
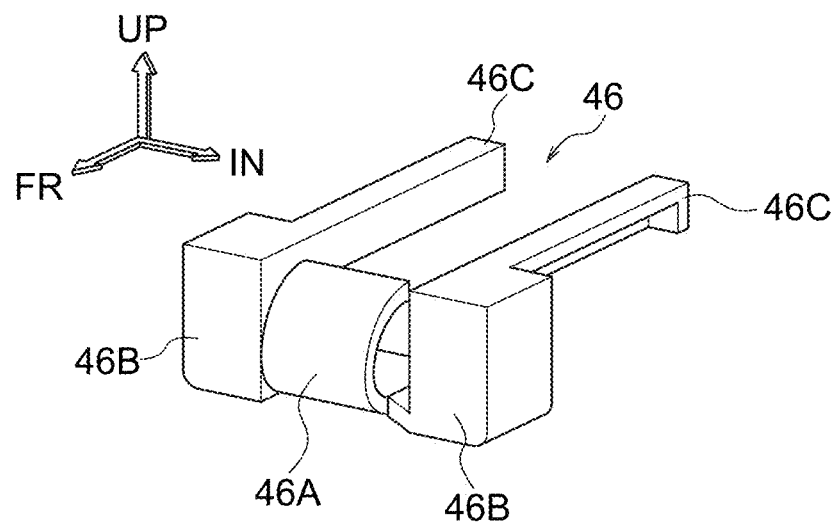
FIG. 8C is an enlarged perspective view of the cable supporter as viewed obliquely from the vehicle front upper side.
Figure 8D:
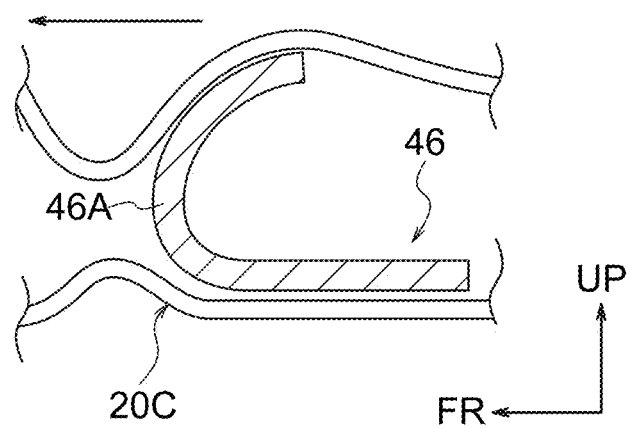
FIG. 8D is an enlarged cross-section of relevant portions of the cable supporter.

As illustrated in FIG. 8A to FIG. 8C, the coupling anchor portions 46C each have one end portion integrally formed to the respective supporter slide portion 46B, and another end portion extending toward the seat rear side and coupled to the slider 14. The coupling anchor portions 46C are respectively formed to the pair of supporter slide portions 46B. The other end portion of each coupling anchor portion 46C has a seat rear side end portion formed in a hook shape bent toward the seat lower side in side view. As illustrated in FIG. 8A, the coupling anchor portion 46C on the seat width direction inside engages with a groove portion 14D1 formed on the seat front side of the slider portion 14D of the slider 14, and is coupled to the slider portion 14D. Although not illustrated in the drawings, the coupling anchor portion 46C on the seat width direction outside similarly engages with a groove portion formed in the slider portion 14E, and is coupled to the slider portion 14E.

Other Configuration of Vehicle Seat 30

As illustrated in FIG. 2, in the present exemplary embodiment, the power supply unit 10 is constructed using the slide rail 12R and the slider 14R on the seat width direction outside, these being configuration elements of the vehicle seat 30. The slide rail 12L and the slider 14L on the seat width direction inside, these also being configuration elements of the vehicle seat 30, are not equipped with configuration elements of the power supply unit 10 such as the cable 20, but are configured similarly to the slide rail 12R and the slider 14R.

As illustrated in FIG. 3A, FIG. 3B, and FIG. 4, the power supply unit 10 according to the present exemplary embodiment includes the slide rail 12, the slider 14, the first connector 16, and the second connector 18. As illustrated in FIG. 1C, the opening 12H is formed at the upper side of the slide rail 12. The slider 14 is configured so as to slide along the slide rail 12. The first connector 16 is fixed to the one end portion 12a of the slide rail 12. The second connector 18 is fixed to the slider 14.

Note that the power supply unit 10 includes the cable 20. The cable 20 is housed inside the slide rail 12. As illustrated in FIG. 5A, the one end 20A of the cable 20 is connected to the first connector 16. The other end 20B of the cable 20 is folded back as illustrated in FIG. 1A, and is connected to the second connector 18 as illustrated in FIG. 5B. The cable 20 is a flexible cable. A surplus length location of the cable 20 required due to the sliding of the cable 20 and the slider 14 is thereby contained inside the slide rail 12, obviating the need for a region to contain the cable 20 outside the slide rail 12. To elaborate, there is no need to provide, outside the slide rail 12, routing space for the cable 20, surplus length space for the cable 20, nor a casing to secure the routing and surplus length space.

The power supply unit 10 thereby enables an efficient and suitable layout on the floor 22 illustrated in FIG. 2 where the slide rail 12 is installed.

As illustrated in FIG. 1A, FIG. 1B, FIG. 3A, FIG. 3B, and FIG. 4, the power supply unit 10 of the present exemplary embodiment includes the rail cover 40 and the cable guide 44. The rail cover 40 blocks the opening 12H, and the slit 40D is formed to the rail cover 40 so as to run along the length direction of the slide rail 12. As illustrated in FIG. 1A, the cable guide 44 is installed to the slider 14. As illustrated in FIG. 6A to FIG. 6B, the cable guide 44 is configured so as to grip the cable 20 and to lead the cable 20 into the slide rail 12 through the slit 40D. Since the opening 12H of the slide rail 12 is blocked by the rail cover 40, ingress of dust, debris, and the like into the slide rail 12 through the opening 12H can be effectively suppressed. In addition thereto, the cable guide 44 is installed to the slider 14, thereby enabling the cable 20 to be smoothly led into the slide rail 12, even when the slider 14 is sliding. Moreover, the opening 12H of the slide rail 12 is blocked by the rail cover 40, making the inside of the slide rail 12 harder to see, and enabling the appearance of the area surrounding the power supply unit 10 and the slide rail 12 to be improved.

As illustrated in FIG. 7A to FIG. 7E, in the power supply unit 10 according to the present exemplary embodiment, the cable guide 44 is configured including the width adjuster portion 44B. The width adjuster portion 44B widens the slit width of the slit 40D when the slider 14 passes through as illustrated in FIG. 7E compared to when the slider is not passing through as illustrated in FIG. 7B. This enables the slit width of the rail cover 40 when the slider 14 is not passing through to be made narrower, and the surface area blocking the opening 12H of the slide rail 12 to be increased, thereby enabling ingress of dust, debris, and the like into the slide rail 12 through the opening to be even more effectively suppressed. This also makes the inside of the slide rail 12 even harder to see, and enables the appearance of the area surrounding the power supply unit 10 and the slide rail 12 to be improved.

In the power supply unit 10 according to the present exemplary embodiment, the cable 20 as illustrated in FIG. 3B and FIG. 4 is a flexible flat cable, and the cable guide 44 is configured including the deflecting guide portion 44A as illustrated in FIG. 6A and FIG. 6B. The flexible flat cable is housed inside the slide rail 12 with its thickness direction in the seat up-down direction, and secures current capacity by its width direction. This enables the amount of power supplied by the flexible flat cable to be increased even with a thinner thickness, thereby enabling the routing space of the flexible flat cable inside the slide rail 12 to be reduced. The routing space is particularly reduced in the height direction inside the slide rail 12. This enables the flexible flat cable to be easily routed inside the slide rail 12.

The deflecting guide portion 44A aligns the width direction of the flexible flat cable with the length direction of the slit 40D for insertion into the slide rail 12, and bends the flexible flat cable inside the slide rail 12 such that its thickness direction is in the up-down direction. This enables the flexible flat cable to be passed through the slit 40D without greatly widening the slit width of the slit 40D of the rail cover 40. Expressed in other words, the region where the opening 12H of the slide rail 12 is blocked by the rail cover 40 can be increased, thereby enabling ingress of dust, debris, and the like into the slide rail 12 through the opening 12H is be even more effectively suppressed. The appearance of the area surrounding the power supply unit 10 and the slide rail 12 can also be improved.

As illustrated in FIG. 1A, FIG. 1B, and FIG. 5B, in the power supply unit 10 according to the present exemplary embodiment, the portion of the flexible flat cable with its width direction along the seat up-down direction (the other end 20B of the cable 20) can be freely routed in its thickness direction, thereby enabling the degrees of freedom for a fixing position of the second connector 18 to the slider 14 to be increased. In addition thereto, the second connector 18 is installed to the slider 14 with its length direction along the seat up-down direction, this being aligned with the width direction of this portion of the flexible flat cable (the other end 20B of the cable 20). This enables the power supply unit 10 to be made slimmer in the seat width direction, as illustrated in FIG. 1B.

As illustrated in FIG. 1A and FIG. 8A to FIG. 8D, the power supply unit 10 according to the present exemplary embodiment includes the cable supporter 46. The cable supporter 46 is installed to the slider 14. The cable 20 is entrained around the cable supporter 46 and the cable 20 is folded back by the cable supporter 46. Spanning from the first connector 16 to the cable supporter 46, the cable 20 is thereby pushed inside the slide rail 12 by movement of the cable supporter 46 accompanying sliding of the slider 14. This enables the routed state of the cable 20 inside the slide rail 12 to be maintained. In addition thereto, the folded-back position of the cable 20 can be moved by the cable supporter 46 so as to correspond to the slide position of the slider 14, thereby enabling slack in the cable 20 housed inside the slide rail 12 to be reduced, and the slider 14 to slide smoothly.

As illustrated in FIG. 2, the vehicle seat 30 according to the present exemplary embodiment includes the power supply unit 10 and the seat body 32. The seat body 32 is attached to the slide rail 12 through the slider 14. The seat body 32 includes the load 34, and the second connector 18 is connected to the third connector 36 that is connected to the load 34 (see FIG. 3A). This enables similar operation and advantageous effects to be obtained by the vehicle seat 30 as the operation and advantageous effects obtained by the power supply unit 10.

The present disclosure is not limited to the above exemplary embodiment, and various modifications may be made within a range not departing from the spirit thereof. For example, in the above exemplary embodiment, a slide rail and a slider on the seat width direction outside of a vehicle seat are employed to construct a power supply unit; however, in the present disclosure, a slide rail and a slider on the seat width direction inside may be employed to construct a power supply unit. Furthermore, the present disclosure may be applied to a power supply unit configured including a slide rail and a slider of a sliding door in vehicles including a sliding door structure.

What is claimed is:
1. A power supply unit comprising:
a slide rail that has an opening at an upper side;
a slider that slides along the slide rail;
a first connector that is fixed to one end portion of the slide rail;
a second connector that is fixed to the slider;
a flexible cable that is housed inside the slide rail, that has one end connected to the first connector, and that has another end folded back and connected to the second connector;

a rail cover that blocks the opening of the slide rail and that has a slit formed along a length direction of the slide rail; and a cable guide that is installed to the slider, that grips the cable, and that leads the cable into the slide rail through the slit.

2. The power supply unit of claim 1, wherein the cable guide is configured including a width adjuster portion that increases a width of the slit when the slider passes through to be wider than when the slider is not passing through.

3. The power supply unit of claim 1, wherein:

the cable is a flexible flat cable; and the cable guide is configured including a deflecting guide portion that aligns a width direction of the flexible flat cable with a length direction of the slit to insert the flexible flat cable into the slide rail through the slit, and that bends the flexible flat cable inside the slide rail such that a thickness direction of the flexible flat cable is along an up-down direction.

4. The power supply unit of claim 1, wherein:

a first guide piece and a second guide piece with left-right symmetrical profiles to each other about a central axis of the cable guide in a seat width direction are superimposed on each other in the seat width direction to form the cable guide, and the first guide piece and the second guide piece each include an anchor portion protruding to a seat rear side from a seat rear side end portion;

the slider includes a left and right pair of slide portions disposed on either side of a central axis of the slider in the seat width direction in order to slide along the slide rail, and the slide portions each include an engaging portion formed at a seat front side end portion; and the cable guide is installed to the slider by engaging the anchor portions and the engaging portions with each other.

5. The power supply unit of claim 2, wherein:

the width adjuster portion is formed at a seat front side end portion of the cable guide in a fan shape gradually widening from a seat front side toward a seat rear side, and with a curving sloped face profile projecting toward a seat upper side.

6. The power supply unit of claim 3, wherein:

the cable guide is formed by a first guide piece and a second guide piece with left-right symmetrical profiles to each other about a central axis of the cable guide in a seat width direction and superimposed on each other in the seat width direction;

the deflecting guide portion includes a lead-in location and a lead-out location;

the lead-in location is formed at a seat width direction outer side of the first guide piece and is recessed in a substantially triangular shape in a side view; and the lead-out location is formed at a seat width direction inner side of the second guide piece and is recessed in a substantially trapezoidal shape in a side view.

7. The power supply unit of claim 3, wherein the other end of the flexible flat cable is connected to the second connector with a width direction of the other end along an up-down direction.

8. The power supply unit of claim 3, further comprising a cable supporter that is installed to the slider, that the flexible flat cable is entrained around, and that folds back the flexible flat cable.

9. A vehicle seat including a power supply unit, the vehicle seat comprising:

the power supply unit of claim 1; and a seat body that is attached to the slide rail through the slider and that is installed with a load connected to the second connector.

* * * * *